May 1, 1962 — R. C. HAMON — 3,032,445
TOBACCO SMOKE FILTERS
Filed June 24, 1959
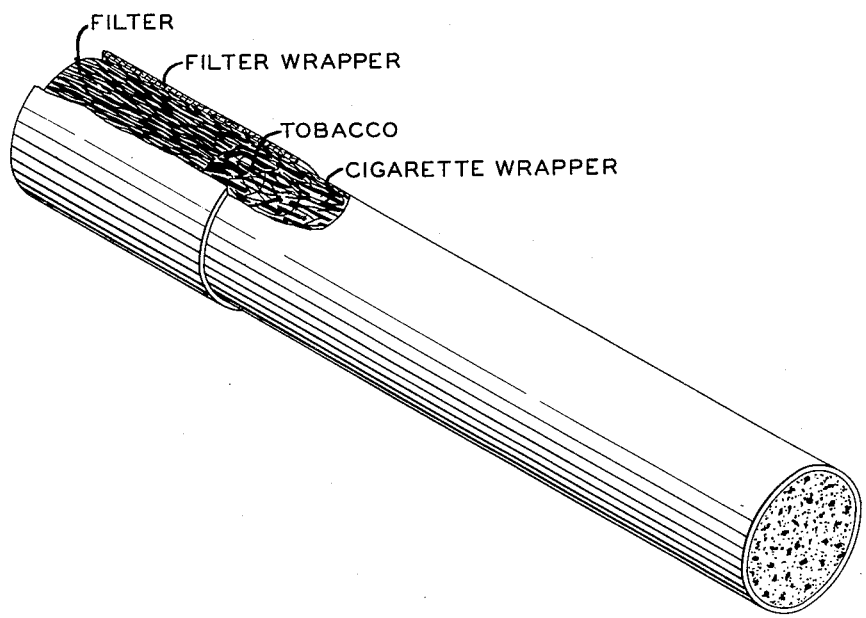
INVENTOR.
RAY C. HAMON
BY William R. Moran
ATTORNEY United States Patent Office 3,032,445
Patented May 1, 1962

3,032,445
TOBACCO SMOKE FILTERS
Ray C. Hamon, St. Albans, W. Va., assignor to Union Carbide Corporation, a corporation of New York
Filed June 24, 1959, Ser. No. 822,435
15 Claims. (Cl. 131—10)

This invention relates, in general, to tobacco smoke filters. In one aspect, this invention relates to tobacco smoke filtering elements which contain water-soluble resins. In another aspect, this invention relates to tobacco smoke filtering elements which contain water-soluble and/or water-dispersible gums and resins adaptable for use in filter tip cigarettes.

It is generally acknowledged that filters in cigarettes must of necessity be formed from materials which are inexpensive, odorless, and tasteless. In addition, the materials should be firm, and of such a nature as to have no annoying hindrance when the smoke is drawn through them. Primarily, in addition to the above desired features, the filtering material must possess the capacity to remove objectionable and undesirable constituents present in the smoke by either chemical or physical means.

This concept of employing filters for tobacco smoke is undoubtedly not a recent one. In the past, various traps for tars and other materials have been utilized as illustrated by the familiar and ancient Mideastern hookah or water pipe. More recently, however, various other means have been employed as filters, either alone or in combination, in an attempt to effect the removal of the undesirable components of tobacco smoke. For example, filters have been made of, or combined with, such materials as dextran, activated charcoal, silica gel, ion exchange resins, cellulose ester fibers, and the like. Although such filtering materials, whether employed alone or in combination, possess desirable filtering properties, no completely satisfactory filter has been made available which is of relatively low cost as to be economically attractive for use in cigarettes and simultaneously possess a high filtering capacity for purifying and clarifying the smoke. The hydrophilic materials have been particularly neglected, possibly because it is thought that they would have little preference for ingredients of the smoke other than water vapor.

Accordingly, one or more of the following objects will be achieved by the practice of the instant invention. It is an object of the present invention to provide novel filtering elements adaptable for use in filter tip cigarettes wherein the disadvantages of filters previously employed are largely overcome. It is also an object of the present invention to provide novel filtering elements comprising water-soluble resins. Another object of this invention is to provide filtering elements containing solid poly(ethylene oxide). A further object is to provide novel filtering elements containing copolymers comprised of at least 50 weight percent of ethylene oxide in copolymerized form with up to 50 weight percent of lower olefin oxides, for example $C_3$ and $C_4$'s. Another object is to provide filtering elements comprising water-soluble and/or water-dispersible gums and resins. A further object of the present invention is to provide relatively inexpensive filtering elements for effectively purifying the smoke from cigarettes. Another object of the present invention is to provide filtering elements for removing undesirable constituents from tobacco smoke. A still further object is to provide a process for the preparation of the novel filtering elements of this invention. These and other objects will readily become apparent to those skilled in the art in the light of the teachings herein set forth.

A broad aspect of this invention is directed to a tobacco smoke filtering element comprising water-soluble resins. These water-soluble resins, as hereinafter described, comprise solid poly(ethylene oxide) or copolymers containing at least 50 weight percent of ethylene oxide in copolymerized form with up to 50 weight percent of a second lower olefin oxide, for example, propylene oxide, butylene oxide, and the like. Filters containing these novel water-soluble resins exhibit numerous advantages, many of which have been found to be lacking in conventional filtering elements. Poly(ethylene oxide) and the above illustrated copolymerized water-soluble resins can be handled and processed in a manner similar to conventional thermoplastic resins, and although they are essentially water-soluble, they are relatively stable when exposed to humid air for extended periods of time. Additionally, due to the irregular structure of the poly(ethylene oxide) and copolymer particles which permit appreciable adsorption, they are ideally suited for use as a filtering medium. Thus, the combination of the hydrophilic and adsorptive characteristics of the resin results in a highly desirable chemical and physical filtering action.

In a preferred embodiment of the present invention, the novel filtering elements are prepared from resinous poly(ethylene oxide) and/or the aforementioned copolymers which have a reduced viscosity value in the range of from about 1.0, and less, to 75, and higher, preferably from about 2 to about 60. These polymers can be in the form of films, granules, powder, particles, strands, crimped or crinkled fibers, filaments, honeycomb, sponge, or any other form which is deemed suitable for effecting filtration of tobacco smoke. Because of their unique water solubility and resinous characteristics, the poly(ethylene oxide) and copolymers can be cast or extruded in numerous shapes which are useful as a filtering medium. The particular form in which the resin is employed will largely be dependent upon the size, shape and purpose of the filter.

One embodiment of the present invention is set forth in the accompanying drawing which illustrates a cigarette having attached thereto a filtering element prepared from the aforementioned filtering material.

It should be noted that the term "poly(ethylene oxide)" as used throughout the specification and appended claims, refers to ethylene oxide polymers which have a reduced viscosity value, in acetonitrile, of about 1, or less, and upwards to 75, and higher. Reduced viscosity is an indirect measurement of the molecular weight of the polymer and it is a value obtained by dividing the specific viscosity by the concentration of the ethylene oxide polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. The reduced viscosities herein referred to are measured at a concentration of 0.2 gram of poly(ethylene oxide) in 100 milliliters of acetonitrile at 30° C.

The copolymers containing at least 50 weight percent of ethylene oxide in copolymerized form with up to 50 weight percent of lower olefin oxides likewise refer to those copolymers which have a reduced viscosity value of about 1, or less, and upwards to 75, or higher, as measured by the above method.

The preparation of solid alkylene oxide polymers such as poly(ethylene oxide), poly(propylene oxide), poly(butylene oxide) and the like is the subject matter of the application entitled, "Polymerization of Epoxides," by F. N. Hill and F. E. Bailey, Jr. Serial No. 587,933, filed May 29, 1956, and assigned to the same assignee as the instant application. The above-mentioned application teaches the preparation of poly (alkylene oxide), e.g., poly(ethylene oxide), by polymerizing alkylene oxide in contact with certain metal carbonate catalysts, such as, for example, calcium carbonate, barium carbonate, strontium carbonate and others. These metal carbonate catalysts are advantageously employed in concentrations in the range from about 0.3 to 3 parts by weight per 100 parts by weight of alkylene oxide. The polymerization reaction can be conducted in the liquid phase at a temperature in the range from about 70° C. to about 150° C. It is preferred that the metal carbonate catalyst contain not more than one part by weight of non-sorbed water per 100 parts by weight of monomer, and at least 0.01 part by weight of sorbed water per 100 parts by weight of catalyst. It is further preferred that the carbonate catalyst be free from ions which reduced their catalytic activity such as, for example, chlorate and thiosulfate ions. For further information regarding the production of poly(alkylene oxide), reference is hereby made to the disclosure of the above-identified application Serial No. 587,933, now abandoned.

The preparation of solid poly(alkylene oxides), including granular poly(ethylene oxide), and the preparation of $C_2$ and $C_3$ or $C_4$ copolymers having a reduced viscosity in acetonitrile in the range from about 1.0 to about 60, and higher, is the subject matter of the application entitled "Polymerization of Epoxides," by F. N. Hill, J. T. Fitzpatrick and F. E. Bailey, Jr., Serial No. 783,185, filed December 29, 1958, and assigned to the same assignee as the instant application. This application teaches the preparation of olefin oxide polymers by polymerizing monomeric alkylene oxide(s), alone or in admixture with another alkylene oxide, in contact with about 0.2 to about 10 parts by weight, per 100 parts by weight of the total monomer(s) of a catalyst such as the alkaline earth metal amides. The polymerization reaction is preferably conducted at a temperature in the range from about −30° C. to 150° C., preferably from 0° C. to 150° C. It is preferred to conduct the polymerization reaction in the presence of a liquid organic vehicle such as the normally liquid straight and branch chain saturated hydrocarbons, cyclic and alkyl-substituted cyclic saturated hydrocarbons, and the like, for example, heptane, methylcyclopentane, etc. When ethylene oxide is homopolymerized in the presence of a vehicle such as illustrated above, in which said ethylene oxide is soluble and the poly(ethylene oxide) is insoluble, under agitation of the reaction mixture, there results the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly(ethylene oxide) is obtained in a granular state, that is, a finely-divided solid particle form. For further information regarding the production of granular poly(ethylene oxide), reference is hereby made to the disclosure of application Serial No. 783,185.

In another aspect of the present invention, the novel filtering elements can also be prepared from water-soluble and/or water-dispersible gums and resins hereinafter also referred to as hydrophilic materials. Illustrative of such materials are alginic acid, alkali metal salts of carboxymethyl cellulose, polysaccharides, gum arabic, gelatin derived from either acid-conditioned or lime-conditioned collagen, potato starch, sodium alginate, poly(vinyl alcohol), and the like. Each of these compounds has, in common, the property of being water-soluble or water-dispersible in addition to its hydrophilic characteristics. It should be noted that the hydrophilic materials employed in these novel filters are not only water-sensitive, but are water-soluble or water-dispersible, so that filters can be prepared by numerous methods. Additionally, the materials employed in this invention are not used merely as binders or film-forming materials to hold other filtering materials in place, but these materials are employed as the major active filtering medium itself. Each of these materials has a unique feature which distinguishes it over certain other cellulose filtering materials currently in use, that is, it possesses water-soluble or water-dispersible characteristics. These materials, like the aforementioned resinous ethylene oxide polymers and copolymers, can also be utilized in various forms such as powders, granules, fibers, and the like.

A further aspect of the present invention includes novel filtering elements prepared from combinations of the resinous poly(alkylene oxides) and the aforementioned water-soluble and/or water-dispersible gums and resins. For example, poly(ethylene oxide) or the copolymers containing at least 50 weight percent of ethylene oxide in copolymerized form with up to 50 weight percent of lower olefin oxides can be used in conjunction with alginic acid, alkali metal salts of carboxymethyl cellulose, polysaccharides, gum arabic, poly(vinyl alcohol), and the like. The respective amounts of each of the above components is not narrowly critical and can vary about 10 to about 90 weight percent based on the total weight of the filter. Concentrations above and below these amounts can also be employed where desirable.

In a still further aspect of the present invention, the novel filtering elements can be composed of the resinous poly(alkylene oxides) or the water-soluble and/or water-dispersible materials, together with known materials which are themselves capable for removing objectionable components from tobacco smoke. For example, suitable active carriers would include, in addition to various combinations of the hydrophilic materials disclosed, such compounds as cellulose acetate, activated charcoal, diatomaceous earth, silica and alumina gels, absorbent cotton, water-insoluble filtering materials, and the like. Thus cellulose acetate can be impregnated or coated with poly(ethylene oxide) to provide a novel tobacco filter. When used in conjunction with other active materials, the hydrophilic materials of this invention preferably constitute from about 10 to about 90 weight percent based on the total weight of the filter. Amounts above and below this range can also be employed, and the optimum ratio for each combination of components comprising the novel filtering elements of this invention can be readily determined by routine experimentation in view of the teachings herein set forth.

In general, it has been observed that the novel filtering elements of this invention should contain at least about 1.0 weight percent of the resinous poly(alkylene oxide) or the hydrophilic material and more preferably at least about 3 weight percent, based on the total weight of the filtering element. The upper limit regarding the concentration of the above materials is not narrowly critical for the filter can consist solely of these compounds, or it can equally as well be used in combination with other filtering materials.

The novel filtering elements of this invention, through both chemical and physical means, are capable of trapping much of the objectionable materials present in tobacco smoke without affecting the taste or draw qualities of the cigarette. Particularly noteworthy is the fact that the filters of the present invention may be prepared economically and are thus attractive for use in filter-tip cigarettes where the cost of additional components must of necessity be kept low. Surprisingly enough, although the compounds employed in the filtering elements are hydrophilic, the amount of water entrapped by the filter is relatively low and consequently does not produce a dry smoke. The water so absorbed by the filter has little or no fluidity and is subject to only moderate fluctuations due to the particular humidity. Thus, the filter does not become soggy or otherwise unsuitable for the practice of this invention.

The novel filtering elements of this invention can be prepared in accordance with methods known in the art.

It is thus within the teachings of this invention, as previously indicated, to employ the aforementioned materials alone, in combination with inert carriers, or in conjunction with known and proven tobacco filtering materials. For example, the above materials which are employed in the practice of this invention may be used as the sole filtering medium. In cigarette holders or pipes, the material can be enclosed in a tubular cartridge for easy insertion and disposal. In such circumstances the powder, granular, or fibrous form may be preferred. In filter-tip cigarettes the filter is usually of a cylindrical or elongated rod shape and forms an integral part of the cigarette and may preferably be of the fibrous, sponge, or granular form. The filtering materials of the present invention can also be employed with an inert carrier, which itself has little or no filtering capacity. For example, the hydrophilic material or water-soluble poly(alkylene oxide) resins may be utilized as a coating on an inert carrier or deposited as a thin film or granules on a sheet of inert backing material. The sheet is subsequently rolled over itself into a spiral cylinder whereby the smoke is passed through the various concentric layers over a wide surface area of filtering material.

The following examples are illustrative:

*Example 1*

A package of filter-tip cigarettes produced by Philip Morris Company and sold under the trade name of "Marlboro" was purchased on the open market. A cigarette was chosen at random from the freshly-opened pack, and the filter was carefully removed. Approximately two-thirds of the filter, by volume, was cut away and weighed on an analytical balance. The remaining portion of the filter was also weighed on an analytical balance. A new filter was prepared by replacing the larger section of the old one with an approximate equivalent weight of granular poly(ethylene oxide) resin possessing a viscosity of 2000–4000 centipoises in aqueous solution of 1 weight percent concentration at 25° C. This granular polymer had an average particle size of minus 100 mesh; the smaller portion of the original filter made up the remainder of the test product. The poly(ethylene oxide) resin portion was positioned so that the resin granules were in contact with the main body of the cigarette. The fibrous portion from the old filter was in contact with the other end of the body of resin and was closest to the end which a smoker would hold in the mouth. This arrangement would serve the double purpose of keeping the resin grains in place and of giving the smoker a filter surface to which he was accustomed at the end of the cigarette. Another cigarette was chosen at random from the pack to act as control. Its filter was carefully removed and weighed on an analytical balance, then carefully replaced in the cigarette.

A smoking assembly was prepared by connecting a four-liter flask to a laboratory vacuum line, to act as a "lung," then connecting rubber tubing and a short glass holder to the flask. The glass holder was a piece of tubing selected for close fit around the cigarette. A small stop-cock was inserted between the laboratory vacuum outlet and the flask. It was predetermined that 1.5 inches of cigarette could be smoked in a five-minute period by taking "draws" of 2 seconds duration every 30 seconds, and it was judged that this approximated average smoking by a human being. The test cigarettes were therefore marked at 1.5 inches from the tip to be lit and were smoked according to this cycle.

At the conclusion of the test, the filters were carefully removed from the cigarettes and weighed on an analytical balance. The control filter showed a weight gain of 7.6 percent. The experimental filter containing the poly(ethylene oxide) showed a weight gain of 14.3 percent.

*Example 2*

The preceding experiment was duplicated with granular poly(ethylene oxide) resin possessing a viscosity of 5500 centipoises, or higher, in aqueous solution of 1 weight percent concentration at 25° C., and having a particle size of minus 100 mesh. The control filter showed a gain in weight of 9.1 percent. The experimental filter showed a gain in weight of 16.8 percent.

*Example 3*

The procedure of Examples 1 and 2 was used to compare test filters with the commercial filter in cigarettes produced by The American Tobacco Company and sold under the trade name of "Tareyton." However, this brand of cigarette uses a dual filter, consisting of a plug of fiber at the end of the cigarette plus a roll of crepe dotted with grains of activated charcoal next to the tobacco. In preparing test filters, the charcoal-bearing crepe and approximately half of the fiber were removed and replaced, respectively, by an approximately equivalent weight of poly(ethylene oxide) resin possessing viscosity of 2000 to 4000 centipoises and poly(ethylene oxide) resin possessing a viscosity of 5500 or higher. The resin having the higher viscosity was identical with that in Example 2, but the particle size of the resin of lower viscosity was minus 60 plus 100 mesh, instead of the minus 100 mesh size used in Example 1.

After smoking, the control filter showed a weight gain of 10.8 percent. The test filter containing the poly(ethylene oxide) resin having the viscosity of 2000 to 4000 centipoises had a weight gain of 14.3 percent, while the one containing poly(ethylene oxide) resin of 5500 centipoises had a weight gain of 22.5 percent.

*Example 4*

Since the poly(ethylene oxide) resins used in the preceding examples were high in molecular weight, as indicated by their solution viscosities, an experiment duplicating Examples 1 and 2 was run with granular poly(ethylene oxide) resin possessing a viscosity of 225–375 centipoises, in aqueous solution of 5 weight percent concentration at 25° C. and having a particle size of minus 60 plus 100 mesh, and poly(ethylene oxide) resin possessing a viscosity of 1500–2500 centipoises, in aqueous solution of 5 percent concentration at 25° C., and having a particle size of minus 60 plus 100 mesh.

At the conclusion of the test, the control filter showed a weight gain of 6.9 percent. The test filter, containing the poly(ethylene oxide) resin having a viscosity of 225 to 375 centipoises showed a weight gain of 19.6 percent, and the test filter, containing the poly(ethylene oxide) resin having a viscosity of 1500–2500 centipoises, showed a weight gain of 15.7 percent.

*Example 5*

The procedure of Examples 1 and 2 was repeated, using "Kelacid" as the material in the test filter. This material is a colloidal polymer of anhydro-β-D-mannuronic acid produced by the Kelco Company, New York, Chicago, and Los Angeles. At the conclusion of the test, the control filter showed a weight gain of 10.2 percent. The test filter showed a weight gain of 26.0 percent.

*Example 6*

The procedure of Examples 1 and 2 was repeated, using "CMC," Type 70 Low, as the material in the test filter. This material is a sodium salt of carboxymethyl cellulose produced by the Hercules Powder Company, Wilmington, Delaware. Type 70 Low is characterized by a viscosity of 25–50 centipoises in aqueous solution of 2 weight percent concentration at 25° C. At the conclusion of the tset, the control filter showed a weight gain of 8.1 percent. The test filter showed a weight gain of 21.0 percent.

*Example 7*

The procedure of Examples 1 and 2 was repeated, using

"Ramalin" as the material in the test filter. "Ramalin" G, a product of Stein, Hall and Company, Inc., is amylopectin, the branched chain fraction of potato starch, a polysaccharide. It is represented as having a molecular weight over 1,000,000 and is characterized by a viscosity of 10–20 centipoises in aqueous solution of 5 percent concentration at 25° C. At the conclusion of the test, the control filter showed a weight gain of 7.6 percent. The test filter showed a weight gain of 10.6 percent.

*Example 8*

Since the "draw" of a cigarette is of interest to a smoker, an experiment was devised to demonstrate the effect of poly(ethylene oxide) resins on this property. The basic smoking assembly of Example 1 was modified by installing a wet gas flow meter of 1 liter capacity (AL–17; 99.05; stainless; American Meter Co.) between the 4-liter flask and the outlet of the laboratory vacuum line. An extra stop-cock was installed between the meter and the vacuum line outlet, so that very close control of vacuum could be achieved by manipulating this and the original stop-cock simultaneously.

A smoking schedule was set up so that a two-second "draw" would pull approximately 40 milliliters of gas through the meter. From this point, the procedure followed that described in Example 1, as to brand of cigarette, method of constructing filters, and length of cigarette consumed. Two control "Marlboro" filters; two test filters containing poly(ethylene oxide) resin possessing a viscosity of 225–375 centipoises, in aqueous solution of 5 weight percent concentration at 25° C., granular in form, and having a particle size of minus 60 plus 100 mesh; and one test filter with poly(ethylene oxide) resin possessing a viscosity of 5500 centipoises, or higher, in aqueous solution of 1 weight percent concentration at 25° C., granular in form, and with a particle size of minus 100 mesh were tested.

The following gas flow was observed in the experiment.

Filter: Ml. gas used
    Control _____ 275
    Do _____ 250
    Poly(ethylene oxide) resin (225–375 centipoises) _____ 250
    Do _____ 285
    Poly(ethylene oxide) resin (5500 centipoises)__ 275

It was apparent from these results that there were few important differences in the "draw" of these cigarettes.

*Example 9*

Since it might be construed that, for water-soluble gums and resins, the weight gain of a tobacco filter might be caused only by water, a test was set up to demonstrate the entrapment of other materials.

For this purpose, a group of test filters containing poly(ethylene oxide) resin, possessing a viscosity of 5500 centipoises, or higher, in aqueous solution of 1 weight percent concentration at 25° C., was prepared according to the method of Example 1, and an equal number of control filters was carefully removed from "Marlboro" cigarettes. Several small wads of glass wool were also prepared. All of the filters, plus the glass wool, were desiccated for two days in a desiccator containing concentrated sulfuric acid. At the conclusion of the drying period, the filters were replaced in "Marlboro" cigarettes, and the cigarettes were smoked in the manner of Examples 1 and 2. The procedure was slightly modified, in that a wad of the dried glass wool was placed in the glass holder in each case, prior to insertion of the cigarette. After smoking, the glass wool and the filters were carefully weighed, then all were again desiccated for two days over concentrated sulfuric acid.

The weight gains observed after desiccation were as follows:

| Filter | Percent Gain in Filter | Percent Gain in Glass Wool |
| --- | --- | --- |
| Control | 6.4 | 4.5 |
| Do | 6.1 | 3.7 |
| Do | 5.6 | 3.9 |
| Test | 10.0 | 1.9 |
| Do | 10.4 | 2.0 |
| Do | 11.4 | 2.1 |

Thus, the higher the gain in the filter, the more efficient the filtration; similarly, the lower the gain in the glass wool, the more efficient the filtration.

Although the invention has been illustrated by the preceding examples, the invention is not to be construed as limited to the materials employed in the above examples, but rather, the invention encompasses the generic area as hereinbefore disclosed. Various modifications and embodiments of this invention can be made without departing from the spirit and scope thereof.

What is claimed is:

1. As an article of manufacture, a tobacco smoke filtering element comprising a material which is a member selected from the class consisting of (a) solid poly(ethylene oxide) and (b) solid copolymers comprised of at least 50 weight percent of ethylene oxide in copolymerized form with up to 50 weight percent of lower olefin oxides, said material being disposed within an enclosure, whereby tobacco smoke passes through said filtering element and objectionable constituents are removed therefrom.

2. As an article of manufacture, a tobacco smoke filtering element comprising at least about 1 percent by weight of said filtering element of a material which is a member selected from the class consisting of (a) solid poly(ethylene oxide) and (b) solid copolymers comprised of at least 50 weight percent of ethylene oxide in copolymerized form with up to 50 weight percent of lower olefin oxides, said material being disposed within an enclosure, whereby tobacco smoke passes through said filtering element and objectionable constituents are removed therefrom.

3. As an article of manufacture, a tobacco smoke filtering element comprising at least about 1 percent by weight of said filtering element of resinous poly(ethylene oxide), said resinous poly(ethylene oxide) being disposed within an enclosure whereby tobacco smoke passes through said filtering element and objectionable constituents are removed therefrom.

4. As an article of manufacture, a tobacco smoke filtering element comprising at least about 1 percent by weight of said filtering element of a solid copolymer containing at least 50 weight percent of ethylene oxide in copolymerized form with up to 50 weight percent of a lower olefin oxide, said copolymer being disposed within an enclosure whereby tobacco smoke passes through said filtering element and objectionable constituents are removed therefrom.

5. As an article of manufacture, a tobacco smoke filtering element comprising at least about 1 percent by weight of said filtering element, of resinous poly(ethylene oxide) on an inert carrier, said resinous poly(ethylene oxide) and inert carrier being disposed within an enclosure whereby tobacco smoke passes through said filtering element and objectionable constituents are removed therefrom.

6. As an article of manufacture, a tobacco smoke filtering element comprising at least about 1 percent by weight of said filtering element, of resinous poly(ethylene oxide) in admixture with a water-insoluble filtering material, said admixture being disposed within an enclosure whereby tobacco smoke passes through said filtering element and objectionable constituents are removed therefrom.

7. As an article of manufacture, a tobacco smoke filtering element comprising at least about 1 percent by weight of said filtering element, of a solid copolymer containing at least 50 weight percent of ethylene oxide in copolymerized form with up to 50 weight percent of a lower olefin oxide in admixture with a water-insoluble filtering material, said admixture being disposed within an enclosure whereby tobacco smoke passes through said filtering element and objectionable constituents are removed therefrom.

8. As an article of manufacture, a cigarette having integrally connected thereto a tobacco smoke filtering element, said filtering element comprising a material which is a member selected from the class consisting of (a) solid poly(ethylene oxide) and (b) solid copolymers comprised of at least 50 weight percent of ethylene oxide in copolymerized form with up to 50 weight percent of lower olefin oxides, said material being disposed within an enclosure, whereby the tobacco smoke of said cigarette passes through said filtering element and objectionable constituents are removed therefrom.

9. As an article of manufacture, a cigarette having integrally connected thereto a tobacco smoke filtering element, said filtering element comprising at least about 1 percent by weight of said filtering element of a material which is a member selected from the class consisting of (a) solid poly(ethylene oxide) and (b) solid copolymers comprised of at least 50 weight percent of ethylene oxide in copolymerized form with up to 50 weight percent of lower olefin oxides, said material being disposed within an enclosure, whereby the tobacco smoke of said cigarette passes through said filtering element and objectionable constituents are removed therefrom.

10. As an article of manufacture, a cigarette having integrally connected thereto a tobacco smoke filtering element, said filtering element comprising at least about 1 percent by weight of said filtering element, of resinous poly(ethylene oxide), said resinous poly(ethylene oxide) being disposed within an enclosure, whereby the tobacco smoke of said cigarette passes through said filtering element and objectionable constituents are removed therefrom.

11. As an article of manufacture, a cigarette having integrally connected thereto a tobacco smoke filtering element, said filtering element comprising at least about 1 percent by weight of said filtering element of a solid copolymer containing at least 50 weight percent of ethylene oxide in copolymerized form with up to 50 weight percent of a lower olefin oxide, said copolymer being disposed within an enclosure, whereby the tobacco smoke of said cigarette passes through said filtering element and objectionable constituents are removed therefrom.

12. As an article of manufacture, a cigarette having integrally connected thereto a tobacco smoke filtering element, said filtering element comprising at least about 1 percent by weight of said filtering element of resinous poly(ethylene oxide) on an inert carrier, said poly(ethylene oxide) and inert carrier being disposed within an enclosure, whereby the tobacco smoke of said cigarette passes through said filtering element and objectionable constituents are removed therefrom.

13. As an article of manufacture, a cigarette having integrally connected thereto a tobacco smoke filtering element, said filtering element comprising at least about 1 percent by weight of said filtering element of resinous poly(ethylene oxide), in admixture with a water-insoluble filtering material, said admixture being disposed within an enclosure, whereby the tobacco smoke of said cigarette passes through said filtering element and objectionable constituents are removed therefrom.

14. A process for the purification of tobacco smoke which comprises passing said smoke through a filtering element comprising a material which is a member selected from the class consisting of (a) solid poly(ethylene oxide) and (b) solid copolymers comprised of at least 50 weight percent of ethylene oxide in copolymerized form with up to 50 weight percent of lower olefin oxides, whereby objectionable constituents are removed therefrom.

15. A process for the purification of tabocco smoke which comprises passing said smoke through a filtering element, said filtering element comprising at least about 1 percent by weight of said filtering element of resinous poly(ethylene oxide) which has a reduced viscosity of at least 1 as measured at a concentration of 0.2 gram of said poly(ethylene oxide) in 100 milliliters of acetonitrile at 30° C. whereby objectionable constituents are removed therefrom.

References Cited in the file of this patent

UNITED STATES PATENTS

| | | |
|---|---|---|
| 638,088 | Voron | Oct. 31, 1899 |
| 2,639,715 | Molins | May 26, 1935 |
| 2,870,100 | Stewart et al. | Jan. 20, 1959 |
| 2,881,769 | Touey | Apr. 14, 1959 |
| 2,881,771 | Touey | Apr. 14, 1959 |
| 2,933,459 | Gurgiolo | Apr. 19, 1960 |

FOREIGN PATENTS

| | | |
|---|---|---|
| 654,994 | Great Britain | July 4, 1951 |